United States Patent
Davis et al.

(10) Patent No.: US 7,118,226 B2
(45) Date of Patent: Oct. 10, 2006

(54) SEQUENTIAL COLOR RECAPTURE FOR IMAGE DISPLAY SYSTEMS

(75) Inventors: Michael T. Davis, Richardson, TX (US); Steven M. Penn, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/104,370

(22) Filed: Apr. 11, 2005

(65) Prior Publication Data

US 2005/0185148 A1  Aug. 25, 2005

Related U.S. Application Data

(60) Continuation-in-part of application No. 10/910,206, filed on Aug. 3, 2004, which is a division of application No. 09/705,467, filed on Nov. 3, 2000, now Pat. No. 6,771,325.

(60) Provisional application No. 60/173,640, filed on Dec. 30, 1999, provisional application No. 60/163,866, filed on Nov. 5, 1999.

(51) Int. Cl.
  G03B 21/00 (2006.01)
  G03B 21/28 (2006.01)
  H04N 9/12 (2006.01)
  H04N 5/74 (2006.01)
  G02B 21/14 (2006.01)

(52) U.S. Cl. .................. 353/84; 353/31; 348/743; 348/759; 359/634

(58) Field of Classification Search ............ 353/30, 353/31, 84; 348/743, 759; 345/87; 359/245, 359/885–892
See application file for complete search history.

(56) References Cited

U.S. PATENT DOCUMENTS

| 2,933,554 | A | 4/1960 | Fredendall |
| 3,256,385 | A | 6/1966 | Miller |
| 3,685,886 | A | 8/1972 | Nakajima et al. ........... 350/315 |
| 3,748,035 | A | 7/1973 | Mannik ...................... 355/35 |
| 4,305,099 | A | 12/1981 | True et al. .................. 358/231 |
| 4,415,931 | A | 11/1983 | Dischert .................... 358/242 |
| 4,739,396 | A | 4/1988 | Hyatt .......................... 358/60 |
| 4,894,760 | A | 1/1990 | Callahan .................... 362/293 |
| 5,192,946 | A | 3/1993 | Thompson et al. ......... 340/794 |

(Continued)

OTHER PUBLICATIONS

Chinnock, "ASIFs Enable New Projection Systems," Electronic Design website, 2 pages, Sep. 5, 2000.

(Continued)

*Primary Examiner*—Melissa Jan Koval
(74) *Attorney, Agent, or Firm*—Charles A. Brill; Wade James Brady, III; Frederick J. Telecky, Jr.

(57) ABSTRACT

A method for transmitting light in an image display system includes generating a beam of light from a light source. The beam of light is directed at a first segment of an electronically-switchable filter. A first portion of the beam of light is accepted by the first segment of the electronically-switchable filter, and a second portion of the beam of light is rejected by the first segment of the electronically-switchable filter. The first portion of the light beam is modulated to produce at least a portion of a displayed image. The second portion of the light beam is recycled to redirect the second portion of the light beam at a second segment of the electronically-switchable filter. The second portion of the light beam is accepted by the second segment of the electronically-switchable filter. The second portion of the light beam is modulated to produce at least a portion of the displayed image.

19 Claims, 4 Drawing Sheets

U.S. PATENT DOCUMENTS

| | | | |
|---|---|---|---|
| 5,371,543 A | 12/1994 | Anderson | 348/770 |
| 5,410,370 A | 4/1995 | Janssen | 348/786 |
| 5,416,514 A | 5/1995 | Janssen et al. | 348/196 |
| 5,448,314 A | 9/1995 | Heimbuch et al. | 348/743 |
| 5,508,738 A | 4/1996 | Janssen et al. | 348/196 |
| 5,528,318 A | 6/1996 | Janssen | 348/756 |
| 5,532,763 A | 7/1996 | Janssen et al. | 348/744 |
| 5,548,347 A | 8/1996 | Melnik et al. | 348/761 |
| 5,592,188 A | 1/1997 | Doherty et al. | 345/84 |
| 5,608,467 A | 3/1997 | Janssen et al. | 348/744 |
| 5,612,753 A | 3/1997 | Poradish et al. | 348/743 |
| 5,650,832 A | 7/1997 | Poradish et al. | 348/743 |
| 5,684,504 A | 11/1997 | Verhulst et al. | 345/97 |
| 5,760,976 A | 6/1998 | DeLaMatyr et al. | 359/820 |
| 5,781,251 A | 7/1998 | Otto | 398/744 |
| 5,845,981 A | 12/1998 | Bradley | 353/31 |
| 5,868,480 A | 2/1999 | Zeinali | 353/31 |
| 6,005,722 A | 12/1999 | Butterworth et al. | 359/712 |
| 6,028,692 A * | 2/2000 | Rhoads et al. | 359/245 |
| 6,097,456 A | 8/2000 | Wang | 349/105 |
| 6,155,687 A * | 12/2000 | Peterson | 353/84 |
| 6,246,450 B1 * | 6/2001 | Inbar | 349/5 |
| 6,266,105 B1 | 7/2001 | Gleckman | 348/743 |
| 6,273,571 B1 | 8/2001 | Sharp et al. | 353/122 |
| 6,280,034 B1 | 8/2001 | Brennesholtz | 353/20 |
| 6,361,172 B1 | 3/2002 | Brennesholtz | 353/81 |
| 6,591,022 B1 | 7/2003 | Dewald | 382/274 |
| 6,642,969 B1 | 11/2003 | Tew | 348/743 |
| 6,771,325 B1 | 8/2004 | Dewald | 348/743 |
| 6,893,133 B1 * | 5/2005 | Tang | 353/81 |
| 2001/0008470 A1 | 7/2001 | Dewald | 359/850 |
| 2003/0085857 A1 * | 5/2003 | Ramanujan | 345/87 |

OTHER PUBLICATIONS

Mecca, "SID and *Information Display* Announce Display of the Year Awards," Society for Information Display website, 2 pages, Dec. 13, 2000.

Sharp et al., "9.4: High Throughput Color Switch for Sequential Color Projection," SID '00 Digest, vol. 31, p. 92, pp. 1-4, Apr. 2000.

U.S. Appl. No. 11/005,863, filed Dec. 6, 2004, Duane S. Deward et al., entitled, "Multiple Light Source Illumination For Image Display Systems," 30 pages plus 3 pages of drawings.

\* cited by examiner

SEQUENTIAL COLOR RECAPTURE FOR IMAGE DISPLAY SYSTEMS

RELATED APPLICATIONS

This application is a continuation-in-part of U.S. patent application Ser. No. 10/910,206 filed Aug. 3, 2004, and entitled "COLOR RECAPTURE FOR DISPLAY SYSTEMS," which is a divisional of U.S. patent application Ser. No. 09/705,467, filed Nov. 3, 2000, now U.S. Pat. No. 6,771,325, entitled "COLOR RECAPTURE FOR DISPLAY SYSTEMS," which claims the benefit of U.S. Provisional Patent Application No. 60/173,640 filed Dec. 30, 1999, entitled "SEQUENTIAL COLOR RECAPTURE FOR SINGLE-MODULATOR PROJECTION SYSTEMS" and U.S. Provisional Patent Application No. 60/163,866 filed on Nov. 5, 1999, entitled "SEQUENTIAL COLOR RECAPTURE FOR SINGLE-MODULATOR PROJECTION SYSTEMS."

TECHNICAL FIELD OF THE INVENTION

This invention relates in general to image display systems, and more particularly to sequential color recapture in a scrolling color projection system including a scrolling electronically-switchable filter.

BACKGROUND

Spatial light modulators used in sequential color display systems are capable of projecting image details from media sources such as HDTV, DVD, and DVI. Viewers evaluate display systems based on many criteria such as image size, resolution, contrast ratio, color purity, and brightness. Image brightness is a particularly important metric in many display markets since the available brightness can limit the image size of a projected image and controls how well the image can be seen in venues having high levels of ambient light. Projection display designers increase the brightness of a given projection display by increasing the light source used to form the image. Increasing the light source, however, also increases the cost, size, and weight of the display system. Additionally, larger light sources generate additional heat that must be dissipated by the display.

Many other factors affect the brightness of the images produced by the display system. One of the major factors is the number of modulators used to modulate the light used to produce the image. Display systems that use a modulator with a very fast response time, such as the digital micromirror device (DMD®), can use a single modulator to create a full color image. Other display systems use three modulators, such as liquid crystal display (LCD) panels or DMDs, to create a full color image. The disadvantage of the single-modulator sequential color display system is its low image brightness. Because the white light source is time-divided into three or more primary color light beams, most of the light at any given time is not used. For example, when the blue primary color image is being formed, the green and red output of the white light source are filtered out of the light beam and "dumped." Thus, a sequential color display system, while generally less expensive than the three-modulator display system, makes relatively inefficient use of the light produced by the light source.

In addition to reducing the brightness of the image produced by the display system, discarding or "dumping" portions of light creates other problems for the display system. For example, the light filtered out of the light beam generally becomes stray light that the display system must control to prevent the filtered light from reaching the image plane and degrading the contrast of the displayed image. Additionally, the filtered light is generally converted to heat, which must be dissipated by using large fans that increase the noise produced by the display system and increase the size of the display system.

SUMMARY OF THE INVENTION

In one embodiment, a method for transmitting light in an image display system includes generating a beam of light from a light source. The beam of light is directed at a first segment of an electronically-switchable filter. A first portion of the beam of light is accepted by the first segment of the electronically-switchable filter, and a second portion of the beam of light is rejected by the first segment of the electronically-switchable filter. The first portion of the light beam is modulated to produce at least a portion of a displayed image. The second portion of the light beam is recycled to redirect the second portion of the light beam at a second segment of the electronically-switchable filter. The second portion of the light beam is accepted by the second segment of the electronically-switchable filter. The second portion of the light beam is modulated to produce at least a portion of the displayed image.

Depending on the specific features implemented, particular embodiments of the present invention may exhibit some, none, or all of the following technical advantages. A technical advantage may be that an electronically-switchable filter may be used in combination with a light recycler to provide for the recycling of light that is not initially acceptable to the display system for producing an image. In particular embodiments, for example, light that is initially rejected by an electronically-switchable filter may be collected and re-presented to the filter one or more times until the light is accepted by the filter. Accordingly, all color components of a beam of light may be used at any given time to result in improved illumination efficiency. Thus, substantially brighter images may be projected by a single modulator panel display system, and the system may replace three panel display systems that are more costly to implement than a single panel display system.

Because the display system may exhibit improved illumination efficiency characteristics, another technical advantage may be that light sources with longer operational lives at reduced power may be used. Where the lower power light sources produce less heat and typically cost less, the overall volume and mass of the display system may be reduced since there is a reduced need for cooling fans and air ducts, which also reduces cost. As a result, substantially brighter images may be projected with longer lamp life and lower cost.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention, and for further features and advantages thereof, reference is now made to the following description taken in conjunction with the accompanying drawings, in which.

DETAILED DESCRIPTION OF EXAMPLE EMBODIMENTS

A new optical system and method have been developed that dramatically improve the optical efficiency of single-panel sequential color display systems. The system uses a sequential color concept called falling raster or scrolling color in which the illumination beam laterally changes color. Specifically, an electronically-switchable filter may be used in combination with a light recycler to provide for the recycling of light that is not initially acceptable to the system for producing an image. In particular embodiments, for example, light that is initially rejected by the electronically-switchable filter may be collected and re-presented to the filter one or more times until the light is accepted by the filter. Specifically, where the electronically-switchable filter includes multiple scrolling colors that are displayed at any one time, light rejected by one filter segment during the first presentation of the light to the filter may be passed by another filter segment on a subsequent presentation of the same light to the filter. Because the amount of light accepted by the filter is generally increased, the illumination efficiency of the system may also be increased.

Figure 1A:
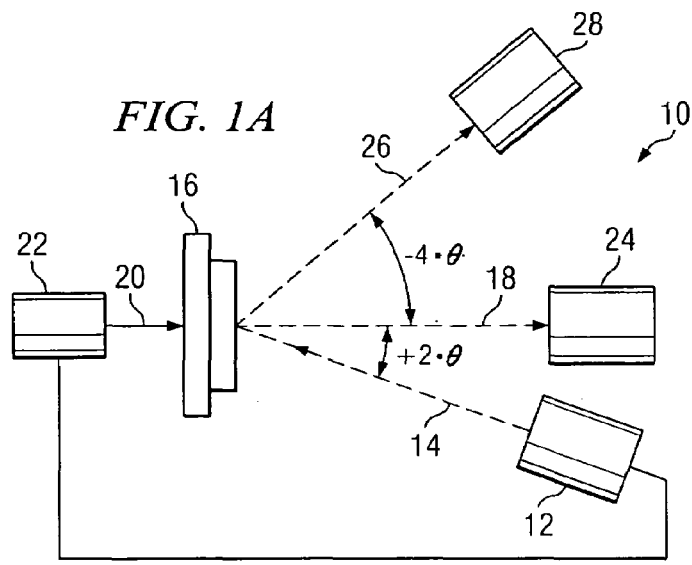
FIGS. 1A and 1B are block diagrams of one embodiment of a portion of an example single panel sequential color display system.

FIG. 1A is a block diagram of one embodiment of a portion of a sequential color display system 10. In this example, sequential color display system 10 includes a light source module 12 capable of generating illumination light beams 14. Light beams 14 are directed from light source module 12 to a modulator 16. Modulator 16 may comprise any device capable of selectively communicating at least some of the received light beams along a projection light path 18. In various embodiments, modulator 16 may comprise a spatial light modulator, such as, for example, a liquid crystal display, a light emitting diode modulator, or a liquid crystal on silicon display. In the illustrated embodiment, however, modulator 16 comprises a digital micro-mirror device (DMD).

A DMD is a micro electromechanical device comprising an array of hundreds of thousands of tilting micro-mirrors. In a flat state, each micro-mirror may be substantially parallel to projection lens 24. From the flat state, the micro-mirrors may be tilted, for example, to a positive or negative angle to alternate the micro-mirrors between an "on" state and an "off" state. For discussion purposes, the angle at which the mirrors may tilt will be measured from projection path 18 and may be designated as theta. In particular embodiments, the micro-mirrors may tilt from +10 degrees to a −10 degrees. In other embodiments, micro-mirrors may tilt from a +12 degrees to a −12 degrees. To permit the micro-mirrors to tilt, each micro-mirror attaches to one or more hinges mounted on support posts, and spaced by means of an air gap over underlying control circuitry. The control circuitry provides electrostatic forces, based at least in part on image data 20 received from a control module 22. In various embodiments, modulator 16 is capable of generating various levels or shades for each color received.

The electrostatic forces cause each micro-mirror to selectively tilt. Incident illumination light on the micro-mirror array is reflected by the "on" micro-mirrors along projection path 18 for receipt by projection lens 24. Additionally, illumination light beams 14 are reflected by the "off" micro-mirrors and directed on off-state light path 26 toward light dump 28. The pattern of "on" versus "off" mirrors (e.g., light and dark mirrors) forms an image that is projected by projection lens 24. As used in this document, the terms "micro-mirrors" and "pixels" are used inter-changeably.

As will be described in more detail below, light source module 12 includes one or more lamps or other light sources capable of generating and focusing an illumination light beam. Where modulator 16 includes a plurality of tilting micro-mirror devices, a tilt on the order of approximately +10 to +12 degrees will result in light source module 12 being in an "on" state. Conversely, a tilt on the order of approximately −10 to −12 degrees will result in light source module 12 being in an "off" state. Although display system 10 is described and illustrated as including a single light source module 12, it is generally recognized that display system 10 may include any suitable number of light sources modules appropriate for generating light beams for transmission to modulator 16.

In particular embodiments, light source module 12 is positioned such that light beam 14 is directed at modulator 16 at an illumination angle of twice theta (where theta is equal to the degree of tilt of the micro-mirror devices in the "on" state). For example, where the micro-mirror devices tilt from approximately +10 to +12 degrees ("on") to approximately −10 to −12 degrees ("off"), light beam 14 may be directed at modulator 16 from light source module 12 positioned at an angle of approximately +20 to +24 degrees from projection path 18. Accordingly, light beam 14 may strike modulator 16 at an angle of approximately +20 to +24 degrees relative to the normal of the micro-mirrors when the micro-mirrors are in a flat state or an untilted position.

When the micro-mirror elements of modulator 16 are in the "on" state direction, illumination beam 14 is reflected approximately normal to the surface of projection lens 24 along illumination path 18. When the micro-mirror elements of modulator 16 are tilted in the "off" state direction, illumination light beam 14 from light source module 12 is reflected along off state light path 26 where it is received by light dump 28. Off state light path 26 is at a negative angle that is approximately equal to four times theta. Thus, where the micro-mirror devices are positioned at approximately −10 to −12 degrees when in the off state, light beam 14 is reflected at an angle of approximately −40 to −48 degrees as measured from projection path 18.

As discussed above, system 10 includes a control module 22 that receives and relays image data 20 to modulator 16 to effect the tilting of micro-mirrors in modulator 16. Specifically, control module 22 may relay image data 20 that identifies the appropriate tilt of the micro-mirrors of modulator 16. For example, control module 22 may send image data 20 to modulator 16 that indicates that the micro-mirrors of modulator 16 should be positioned in the "on" state. Accordingly, the micro-mirrors may be positioned at a tilt angle on the order of approximately +10 to +12 degrees, as measured from projection path 18. Alternatively, control module 22 may send image data 20 to modulator 16 that indicates that the micro-mirrors should be positioned in the "off" state. As such, the micro-mirrors may be positioned at a tilt angle on the order of approximately −10 to −12 degrees, as measured from projection path 18.

Figure 1B:
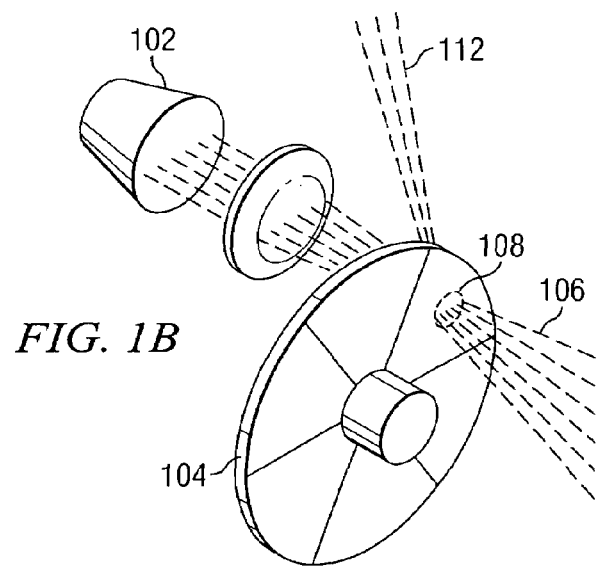

As described above, light source module 12 typically includes one or more lamps (or other light source(s)) and other optical elements and optical groups for generating and focusing beam of light 14 at modulator 16. FIG. 1B illustrates a portion of an example light source module 100 that has been incorporated into prior display systems. In the illustrated embodiment, light source module 100 includes a light source 102 from which light is focused onto a spinning color wheel 104. In particular embodiments, the light generated by light source 102 includes white light comprised of red, green, and blue primary color light beams. The spinning color wheel 104 operates to divide the various colors of light beams in the white light to create a beam of light that changes from one primary color to the next in rapid sequence. Specifically, light source 102 and color wheel 104 cooperate to form a primary colored beam 106 that is passed by an associated filter 108 of color wheel 104. The primary colored beam 106 that is produced is directed generally at modulator 16 (not shown).

For synchronization of color wheel 104 with modulator 16, color wheel 104 may be electrically coupled to control module 22 by connection 100. In particular embodiments, control module 22 may receive a video signal from color wheel 104. Control module 22 may use the video signal to produce image data 20 to modulator 16 to synchronize the micro-mirrors of modulator 16 with color wheel 104. For example, image data 20 representing the red portions of an image is sent to modulator 16 when primary beam of light 106 is passed by the red color filter of color wheel 104. When received by modulator 16, the modulated red beam of light is focused onto an image plane by projection lens 24 to form a red image. The process is repeated as color wheel 104 is spun such that the green and blue filters sequentially pass through the path of primary beam of light 106. Thus, image data 20 representing the green portions of an image is sent to modulator 16 when primary beam of light 106 is passed by the green filter of color wheel 104, and image data 20 representing the blue portions of an image is sent to modulator 16 when primary beam of light 106 is passed by the blue color filter of color wheel 104. The eye of the viewer integrates the three primary color images giving the perception of a single full-color image projected by projection lens 24.

As described above, color wheel 104 operates to time-divide the white light from light source 102 into its primary color components. Thus, at any given time, a portion 112 of light that is generated by light source 102 is reflected from the surface of or otherwise rejected by color wheel 104. The rejected portion of light 112 does not pass through filter 108 and, thus, does not become a part of primary beam of light 106. For example, when a red filter of color wheel 104 is aligned with light source 102, green and blue beams of light do not pass through color wheel 104. Similarly, when a blue filter of color wheel 104 is aligned with light source 102, red and green beams of light do not pass through color wheel 104. Because only a small portion of the light from light source 102 is passed through color wheel 104 at any given time and the remaining light beams are "dumped" by system 10, most of the light generated by light source 102 is not used by modulator 16 to produce the displayed image. As a result, the image displayed may exhibit low image brightness characteristics in comparison to the amount of white light generated by light source 102. Additionally, the rejected portion of light 112 must be controlled to prevent the rejected portion of light 112 from reaching the image plane and degrading the contrast of the displayed image, and the heat produced by the rejected portion of light 112 must be dissipated with large and noisy fans.

Figure 2:
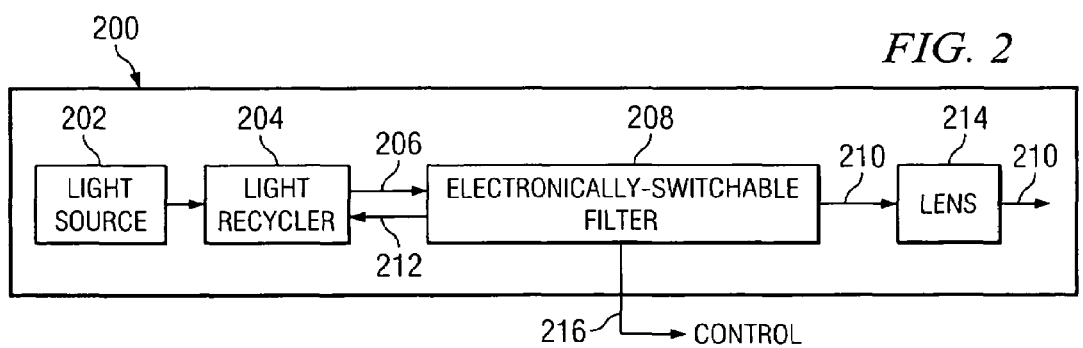
FIG. 2 is a block diagram of a light source module that includes a sequential color recycling system, according to one embodiment of the present invention.

FIG. 2 is a block diagram of a light source module 200 that includes a sequential color recycling system, according to one embodiment of the present invention. Light source module 200 includes a light source 202 that provides a beam of light to a light recycler 204. Light recycler 204, which may in some embodiments include the lamp housing or reflector, homogenizes the white light received from light source 202 to produce homogenized light 206. Homogenized light 206 is then passed to an electronically-switchable filter 208, which operates, in particular embodiments, to transmit a portion of light 210 and reflect a portion of light 212. Transmitted light 210 may be focused by a lens 214 onto modulator 16, which modulates the light to form an image. Conversely, reflected light 212 may be returned to light recycler 204 for further processing by light recycler 204 and electronically-switchable filter 208.

In particular embodiments, electronically-switchable filter 208 uses holographic technology to filter homogenized light 206. Specifically, electronically-switchable filter 208 passes homogenized light 206 through red, green, and blue filters in rapid succession to create a full-color image. An example of such an electronically-switchable filter includes the Application-Specific Integrated Filter (ASIF) produced by DigiLens. The ASIF solid-state filter consists of a stack of electronically switchable Bragg gratings (ESBGs), each optimized to reflect red, green, and blue light. The color filters produced by the ASIF electronically-switchable filter are each subdivided into multiple electronically addressable hologram "stripes" that can be electrically switched off and on to be reflective and nonreflective, respectively. The stripes can be switched to create a rectangular pattern of reflected color light that "scrolls" down the ESBG layer in a semicontinuous set of discrete jumps. As the pattern scrolls off the bottom of the ESBG, it starts to reappear at the top. By superimposing individual color scrolling ESBGs, rectangles of colored light scroll down the ASIF. Drive signals 216 to modulator 16 are synchronized with these color bands, resulting in an electronically-switchable filter 208 with much higher optical efficiencies.

Another example of an electronically-switchable filter that may be used as electronically-switchable filter 208 includes ColorSwitch as produced by ColorLink Inc. The ColorSwitch device consists of three active color filters with crossed polarizers on each end of the assembly. Every active filter is composed of input and output polarization retardation stacks with a single-cell liquid-crystal switch in between. The retardation stacks include thin polycarbonate stacks that function as additive color element filters optimized to transmit either red, green, or blue light. Control voltages activate each filter to pass the specific color for which the ColorSwitch device is optimized. Thus, ColorSwitch enables color-sequential light to be produced as transmitted light 210.

Figures 3A, 3B, 3C:
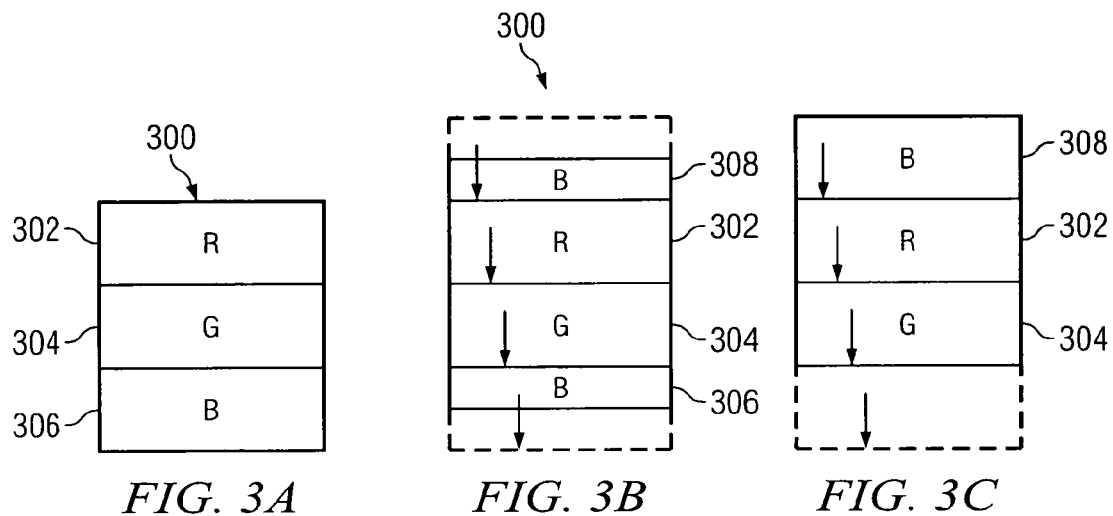
FIGS. 3A–3C illustrate the scrolling effect of transmitted light received by a display system when produced by an electronically-switchable filter, according to one embodiment of the present invention.

As described above, transmitted light 210 is focused by lens 214 onto modulator 16. Where electronically-switchable filter 208 produces filter "stripes" that are electronically switched on and off to create a scrolling rectangular pattern of transmitted light 210, transmitted light 210 is imaged onto modulator 16 such that a separate portion of modulator 16 is illuminated by each filter at any one time. FIGS. 3A–3C illustrate the scrolling effect of transmitted light 210 on modulator 16 when produced by electronically-switchable filter 208, according to one embodiment of the present invention. Specifically, FIG. 3A illustrates modulator 300 onto which transmitted light 210 from electronically-switchable filter 208 is imaged. In the illustrated embodiment, transmitted light 210 includes a red horizontal stripe 302, a green horizontal stripe 304, and a blue horizontal stripe 306. Because the corresponding pattern of light produced by electronically-switchable filter 208 scrolls, the stripes projected onto the modulator also scroll. Accordingly, as blue stripe 306 begins to scroll off of modulator 300, the stripes imaged on modulator 300 are shifted such that a new blue stripe begins to appear at the top of modulator 300. FIG. 3B illustrates the three primary color segments of FIG. 3A shifted lower on the face of modulator 300. As seen in FIG. 3B, as soon as one primary color segment (i.e., blue stripe 306) starts to leave the face of modulator 300, another segment of the same color (i.e., blue strip 308 starts to enter the face of modulator 300. FIG. 3C illustrates modulator 300 after the three primary color segments have shifted the width of one segment.

Since each color appears on a different region of modulator 300 at any given time, the image data 216 provided to modulator 300 is a mixture of data for all three primary colors. For example, while one region of the modulator 300 is operated using red data, other regions of modulator 300 are operated using green and blue data. Due to limitations imposed by the addressing circuitry and the ability to precisely control the sweep of the boundaries between the regions across modulator 300, the rows of modulator 300 are typically divided into several groups and each group receives data for a single primary color. During periods in which the boundary between two regions sweeps across a given group of rows, the group is either turned off or used to create a white component using methods referred to as spoke light recapturing.

As described above, modulator 300 is illustrated as including horizontal rows of modulator cells that receive many of the same operating signals and bias voltages. As a result, the primary color segments have horizontal boundaries and move vertically from row to row. Although such an arrangement may be more efficient to operate, it is recognized that other configurations are also possible. For example, the modulator elements can also be arranged in vertical groups of columns, and the primary color segments may have vertical boundaries and move horizontally from column to column. Thus, it is recognized that modulator 300 may include vertical rows of cells that receive the same operating signals and bias voltages rather than the horizontal rows illustrated in FIGS. 3A–3C. As an additional modification, although the filters for each primary color segment may be substantially the same size to efficiently recycle light that is rejected by electronically-switchable filter 208, it is recognized that the filters for each primary color segment may, in particular embodiments, include filters of unequal size.

Figure 4:
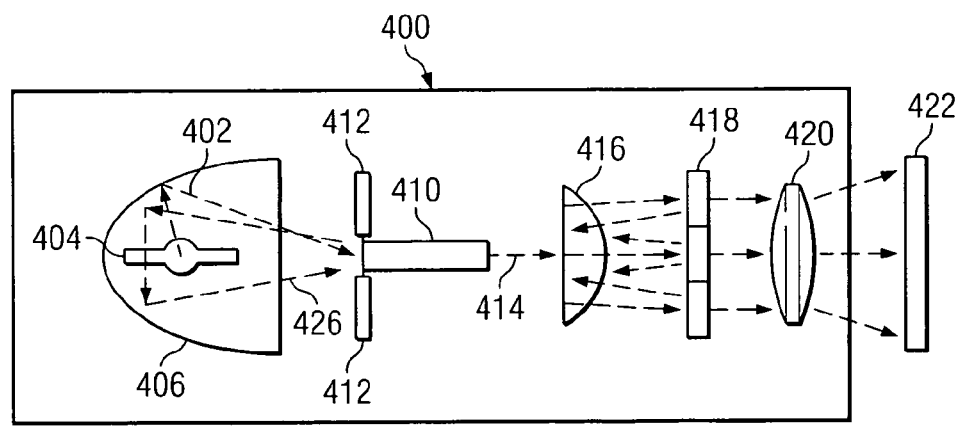
FIG. 4 illustrates a side view of an example light source module that performs sequential color recycling using a transmissive electronically-switchable filter, in accordance with one embodiment of the present invention.

Returning to FIG. 2, it is described above that filter 208 operates to transmit a portion of light 210 and reflect a portion of light 212. In the illustrated embodiment, transmitted light 210 is received at modulator 16, and reflected light 212 is returned to light recycler 204 for further processing by light recycler 204 and electronically-switchable filter 208. Thus, in the illustrated embodiment, electronically-switchable filter 208 comprises a transmissive filter that operates to transmit light in its passband and reflect light outside its passband. FIG. 4 illustrates, in greater detail, a side view of an example light module 400 that performs sequential color recycling using a transmissive electronically-switchable filter, in accordance with one embodiment. Specifically, light 402 from arc lamp 404 is reflected by a reflector 406 and enters an integrating rod 410 through an aperture in a reflective aperture plate 412. It is generally recognized that various integrating rods 410 may be used, and an example of one embodiment of such an integrating rod is discussed in greater detail below with regard to FIG. 6. In particular embodiments, however, integrating rod 410 includes a hollow structure with a reflective internal surface or a solid rod that uses total internal reflection to retain the light passing through it. The light entering integrating rod 410 reflects on the interior surface of integrating rod 410 several times until the beam traveling through integrating rod 410 is homogenized into a uniform cross-section.

Homogenized light 414 exiting integrating rod 410 is transmitted through one or more collimating lenses 416, which operates to divide homogenized light 414 into essentially parallel beams of light that impinge on transmissive electronically-switchable filter 418. A portion of light impinging on transmissive electronically-switchable filter 418 passes through each of the field-sequential color filters of transmissive electronically-switchable filter 418 illuminated by the beam. Each segment transmits some of the incident light and reflects, or rejects, the remainder. Specifically, light that strikes a segment of transmissive electronically-switchable filter 418 that has the same passband is transmitted through electronically-switchable filter 418 to relay optics 420 and modulator 422.

Conversely, light that strikes a segment of transmissive electronically-switchable filter 418 that has a different passband is rejected by transmissive electronically-switchable filter 418. The rejected light is reflected by transmissive electronically-switchable filter 418 and travels back through collimating lens 416 to enter integrating rod 410 in a reverse direction. Depending on the configuration of integrating rod 410, the rejected light may be allowed to exit integrating rod 410 to be reflected by the lamp reflector 406 before re-entering integrating rod 410. The recycled light 426 may be reprocessed by integrating rod 410 and collimating optics 416 before again impinging on transmissive electronically-switchable filter 418. Additionally or alternatively, and as will be described in more detail with regard to FIG. 6, the light rejected by transmissive electronically-switchable filter 418 may also be retained within integrating rod 410, where it is redirected before being re-presented to transmissive electronically-switchable filter 418. In either case, the light rejected by transmissive electronically-switchable filter 418 on the first pass has a ⅔ chance of striking a segment of transmissive electronically-switchable filter 418 having a different passband on a second pass. Thus, the light rejected by transmissive electronically-switchable filter 418 has a ⅔ chance of being rejected by transmissive electronically-switchable filter 418 on the second pass. This process of presenting and re-presenting light to transmissive electronically-switchable filter 418 may continue until the rejected light strikes a segment of transmissive electronically-switchable filter 418 with the same passband and is accepted by transmissive electronically-switchable filter 418, the light is absorbed by integrating rod 410, or the light escapes integrating rod 410 and light module 400. The latter two scenarios may occur where the rejected light is absorbed by the surface coatings of lamp reflector 406 or integrating rod 410 or where the rejected light is absorbed by an electrode of arc lamp 404.

Figure 5:
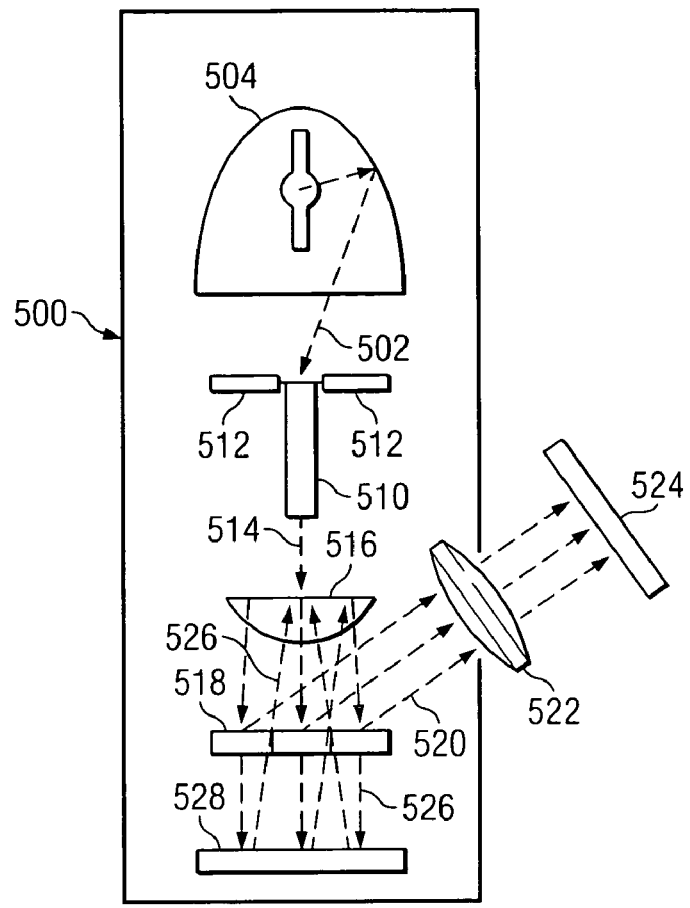
FIG. 5 illustrates a side view of an example light source module that performs sequential color recycling using a reflective electronically-switchable filter, in accordance with one embodiment of the present invention.

As described above and illustrated in FIG. 4, light module 400 recycles light using a transmissive electronically-switchable filter 418. Thus, the light received by modulator 422 is transmitted through, or passed by, transmissive electronically-switchable filter 418. In an alternative embodiment, the electronically-switchable filter of the display system may include a reflective electronically-switchable filter. In such an embodiment, the light received by the modulator may be reflected from the surface of the electronically-switchable filter and rejected light may be passed by the electronically-switchable filter. FIG. 5 illustrates a side view of an example light module 500 that performs sequential color recycling using a reflective electronically-switchable filter, in accordance with one embodiment. Specifically, light 502 from arc lamp 504 is reflected by a reflector 506 and enters an integrating rod 510 through an aperture in a reflective aperture plate 512. In particular embodiments, integrating rod 510 and collimating lens 516 may operate in a manner similar to integrating rod 410 and collimating lens 416 of FIG. 4, respectively. Thus, integrating rod 510 homogenizes light 502 into a uniform cross-section, and collimating lens 516 dives the homogenized light 514 into parallel beams of light that impinge on reflective electronically-switchable filter 518.

Similar to transmissive electronically-switchable filter 418, a portion of light impinging on reflective electronically-switchable filter 518 passes through each of the field-sequential color filters of reflective electronically-switchable filter 518 illuminated by the beam. Thus, each segment transmits some of the incident light and reflects the remainder. Because electronically-switchable filter 518 is a reflective filter, however, it is the reflected portion of light 520 that is transmitted generally to relay optics 522 and modulator 524. Thus, from each segment of reflective electronically-switchable filter 518, modulator 524 receives light 520 that is that is different from, or outside of, the passband of the particular segment of reflective electronically-switchable filter 518 that receives the light.

Conversely, light that is within the passband of the particular segment of the filter receiving the light is transmitted through reflective electronically-switchable filter 518. The light that passes through the reflective electronically-switchable filter is considered "rejected light." In particular embodiments, the rejected light 526 may be reflected from a reflective surface 528, such as a mirror. Rejected light 526 may then travel back through reflective electronically-switchable filter 518 and collimating lens 516 to be reprocessed by integrating rod 510. Once received by integrating rod 510, rejected light 526 may be reflected one or more times by the reflective internal surfaces of integrating rod 510 such that rejected light 526 may be re-presented to reflective electronically-switchable filter 518. Light that is rejected (i.e., passed) by reflective electronically-switchable filter 518 on the first pass has a ⅔ chance of striking a segment of reflective electronically-switchable filter 418 having the same passband on a second pass. Thus, the rejected light 526 has a ⅔ chance of being again rejected (i.e., passed) by reflective electronically-switchable filter 518 on the second pass. This process of presenting and re-presenting rejected light 526 to reflective electronically-switchable filter 518 may continue until the rejected light 526 strikes a segment of reflective electronically-switchable filter 518 with a different passband such that the light is reflected by electronically-switchable filter 518 for transmission to modulator 526, rejected light 526 is absorbed by integrating rod 510, or rejected light 526 escapes integrating rod 510 and light module 500.

Figure 6:
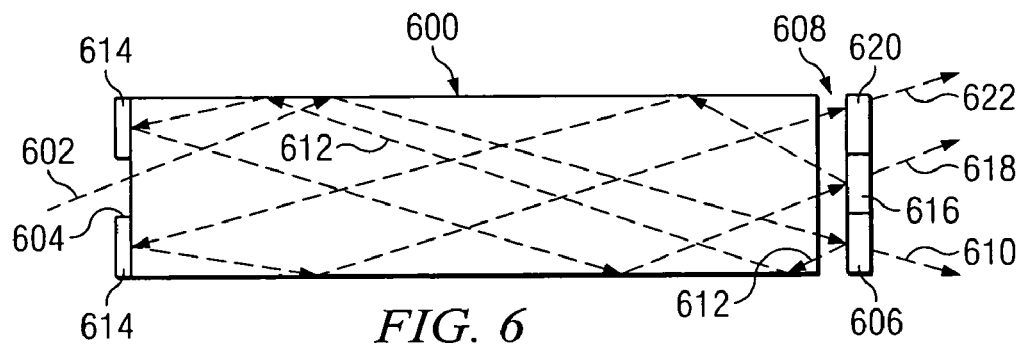
FIG. 6 illustrates a cross-sectional view of an integrating rod that may be used to perform light recycling functions in the light source module of FIG. 2.

Whether the electronically-switchable filter used by the display system includes a transmissive electronically-switchable filter, such as transmissive electronically-switchable filter 418, or a reflective electronically-switchable filter, such as reflective electronically-switchable filter 518, much of the recycling functions described above are performed by the integrating rod. FIG. 6 illustrates a cross-sectional view of an integrating rod 600 that may be used to perform light recycling functions in the light source module of FIG. 2. In particular embodiments, integrating rod 600 includes a hollow structure with internally mirror surfaces. In other embodiments, integrating rod 600 may include a solid glass bar. Regardless of the configuration, integrating rod 600 typically has the same cross section aspect ratio as modulator 16 of display system 10.

Light 602 from a light source enters integrating rod 600 through an aperture 604 in a mirrored entrance end of integrating rod 600. In particular embodiments, aperture 604 may be approximately ⅓ of the total area of the rod end. A relatively small aperture 604 is especially suitable when integrating rod 600 is combined with a low power lamp source that generates a smaller etendue from a smaller arc than a higher powered lamp source. Where integrating rod 600 performs recycling functions such as those described herein, a lower-power light source may be used to increase overall system efficiency without adversely effecting image brightness. In general, the mirrored end surface of integrating rod 600 reflects light striking the integrating rod outside aperture 604. As described above with respect to FIGS. 4 and 5, this light is reflected back to the lamp such that a lamp reflector redirects the light in an effort to return the light to integrating rod 600 at the proper position and angle to be transmitted through aperture 604. Although such a reflective outer surface of integrating rod 600 is generally considered optional, the reflective outer surface may, in particular embodiments, provide an eight to fifteen percent brightness gain over systems without such a reflective outer surface.

The light 602 that enters integrating rod 600 is reflected several times as it travels through integrating rod 600. As light 602 exits the exit end of integrating rod 600, it strikes a first segment 606 of an electronically-switchable filter 608. Where electronically-switchable filter 608 includes a transmissive electronically-switchable filter such as that described above with regard to FIG. 4, first segment 606 may allows a first band 610 of light to pass through electronically-switchable filter 608. The remainder of the light 612 may be considered rejected light and may be reflected by first segment 606 of electronically-switchable filter 608. As illustrated, rejected light 612 travels through integrating rod 600 in a reverse direction from the path that the rejected light 612 initially took within integrated rod 600 as light 602. Within integrating rod 600, rejected light 612 is reflected by the interior surfaces of integrating rod 600 and by reflective mirrors 614 deposited on the entrance end of integrating rod 600.

Upon reflection by mirrors 614, the direction of rejected light 612 is again reversed such that rejected light 612 is transmitted generally in the direction of electronically-switchable filter 608. Thus, rejected light 612 may make its second pass through integrating rod 600 in the direction of electronically-switchable filter 608. It is anticipated that rejected light 612 eventually impinges, for a second time, on a segment of electronically-switchable filter 608. Due to the reflective properties of integrating rod 600, the redirection of rejected light 612 results in rejected light 612 impinging on a second segment 616 of electronically-switchable filter 608, in particular embodiments. Similar to first segment 606, second segment 616 typically allows a second band 618 of light to pass through electronically-switchable filter 608. In particular embodiments, where the light originally emitted by the light source includes three primary components and a first band of light 610 was allowed to pass through first segment 606, fifty-percent of the remaining light striking second segment 616 may be accepted by second segment 616 to pass through electronically-switchable filter 608. The remaining fifty-percent of light that is not allowed to pass through second segment 616 again recycled in the manner described above by integrating rod 600 until the light strikes a third segment 620 of electronically-switchable filter and passes through electronically-switchable filter 608 as a third band of light 622.

Because integrating rod 600 includes aperture 604 at the entrance end of integrating rod 600, it is recognized that at least a portion of rejected light 612 traveling in the reverse direction toward aperture 604 will, in fact, pass through aperture 604 and exit integrating rod 600. For example, where the area of entrance aperture 604 is on the order of ⅓ the total end area of integrating rod 600, it is anticipated that approximately ⅓ of the light rejected by any segment of electronically-switchable filter 608 may exit integrating rod 600 and returns to the lamp and reflector. Where this light is traveling toward the lamp from a point very near the second focus of the reflector, however, the light exiting integrating rod 600 through the aperture 604 has a high probability of passing near the arc and being focused by the reflector back into entrance aperture 604.

In general, the light gain achieved by a reflective aperture 604 is:

$$\text{GAIN} = \sum_{n=0}^{\infty} \left[ \left(1 - \frac{A_1}{A_{INT}}\right)\left(1 - \frac{A_1}{A_{INT}}\right)(R_1)(R_2) \right]^n$$

where:
- $A_1$=Area of a particular color segment projected onto the integrator end surface;
- $A_{INT}$=Area of integrator (assuming equal area on each end);
- $A_2$=Area of input aperture; and
- $R_1/R_2$=Reflectance of each end including loss by bevels, scattering, and light leakage.

Assuming no reflection losses, and setting $A_1/A_{INT}$ and $A_2/A_{INT}$ equal to ⅓, the theoretical efficiency of such a system would be:

Efficiency=(⅓)[1+(⅔)$^2$+(⅔)$^4$+(⅔)$^6$+ ... ] ≈1.8

In other words, a display system 10 having a reflective aperture 604 on integrating rod 600 has the potential to be up to 1.8× more efficient than a field-sequential illumination system with a decreased lamp etendue. Assuming a large loss per reflection of 5%, the efficiency series converges to a 1.65× efficiency gain. The efficiency calculations above assume the light returning to the lamp and reflector is lost. As described above, however, recycled light passing through aperture 604 returns to the lamp and reflector assembly and has a good chance of returning to integrating rod 600 through aperture 604. In particular embodiments, the light returning to aperture 604 from the lamp and reflector assembly may further increase the efficiency of the illumination system by up to twenty percent more than that described above. Therefore, the lamp and reflector assembly may be considered, in particular embodiments, to be an important part of the light recycling functions of system 10.

Figure 7A:
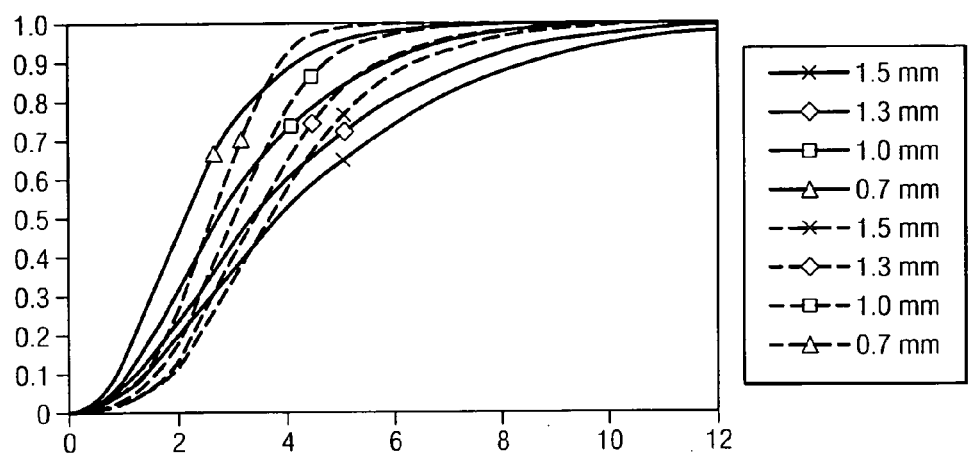
FIGS. 7A–7C illustrate the effects of arc size and aperture size on the efficiency of the sequential color recycling system.
Figure 7B:
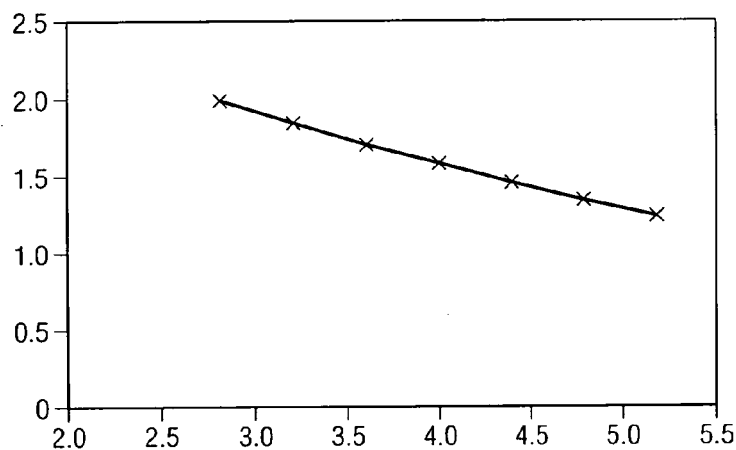
Figure 7C:
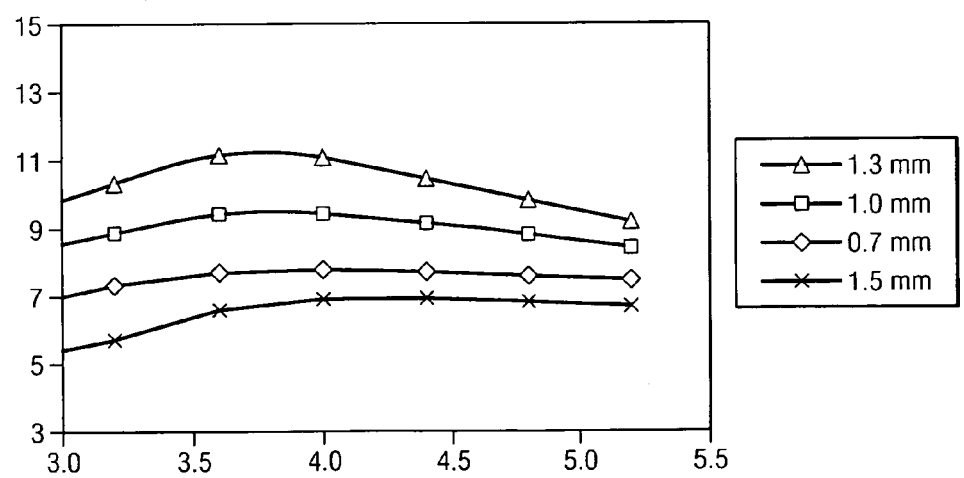

As described above, the size of aperture 204 in the mirrored end of integrating rod 600 has a large effect on the overall efficiency of system 10. In general, a larger aperture 604 results in more efficient light collection from the light source but less efficient recycling of rejected light 612. Likewise, a smaller aperture 604 increases recycling efficiency of rejected light 612 but reduces the amount of light able to enter integrating rod 604. FIGS. 7A–7C illustrate the effects of arc size and aperture size on the efficiency of the sequential color recycling system. Specifically, FIG. 7A is a graphical representation including a series of plots showing modeled collection efficiency versus collection aperture diameter for various lamp arc sizes and reflector designs. In FIG. 7A, the aperture diameter is represented in millimeters on the x-axis, and the f/1 collection fraction is represented on the y-axis. The lamp arc sizes measured range from 0.7 millimeters to 1.5 millimeters. Solid line traces illustrate the collection efficiency of elliptical collectors, and broken line traces illustrate the collection efficiency of parabolic reflectors.

FIG. 7B is a graphical representation illustrating a plot of the recycling gain realized by a 6.4 millimeter×4.8 millimeter integrator rod over a range of mirrored input aperture sizes. Specifically, thee input aperture diameter is represented in millimeters on the x-axis, and the recycling gain is represented on the y-axis. A seven percent reflection loss for each pass through the integrating rod is assumed.

FIG. 7C is a graphical representation illustrating a plot combining the data from FIGS. 7A and 7B to show the overall illumination efficiency over a range of input aperture sizes for several lamp arc sizes. Specifically, the input aperture sizes are represented on the x-axis, and the illumination efficiency is represented in Lumen/watt on the y-axis. As shown in FIG. 7C, the larger the lamp arc size the larger the optimum input aperture of the integrating rod. In general, The greatest efficiency gains are achieved when implementing sequential color recycling in a one-panel (single LCD, DMD, or other modulator) display system. The sequential color recycling methods and apparatus described above allow a single-panel system to achieve much higher efficiencies that were previously possible. Accordingly, a single panel display system may be used in applications that previously required a three-modulator display. Additionally, a much lower power lamp may be used to provide an equivalent brightness to systems that do not use scrolling color recycling. The increase in efficiency has a direct effect on the overall heat load on the projector since the unused light is recycled instead of being absorbed as heat. Application of the methods and systems taught herein, however, is not limited to single-panel display systems. The same techniques are applicable to two and three (or more) panel displays, but typically result in a more expensive display system.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. An image display system comprising:
a light source operable to produce a beam of light;
an electronically-switchable filter comprising a plurality of selectively transmissive and selectively reflective segments, the electronically-switchable filter operable to:
receive the beam of light at a first segment upon a first pass, a first portion of the beam of light accepted by the first segment of the electronically-switchable filter and a second portion of the beam of light rejected by the first segment of the electronically-switchable filter; and
receive at least some of the second portion of the beam of light at a second segment upon a second pass, the second portion of the beam of light accepted by the second segment of the electronically-switchable filter on the second pass;
a light recycler, positioned relative to the electronically-switchable filter to receive the second portion of the beam of light rejected by the first segment of the electronically-switchable filter and to return at least some of the second portion of the beam of light to the electronically-switchable filter in the second pass; and
a modulator operable to;
receive the first and second portions of the beam of light from the electronically-switchable filter; and
modulate the first and second portions of the beam of light to produce at least a portion of a displayed image.

2. The image display system of claim 1, wherein the electronically-switchable filter comprises a stack of a plurality of electronically-switchable Bragg gratings, each of the plurality of electronically-switchable Bragg gratings optimized to accept a unique passband of light.

3. The image display system of claim 2, wherein the first and second segments of the electronically-switchable filter are each operable to be electrically switched off to be reflective and on to be nonreflective.

4. The image display system of claim 1, wherein:
the first and second segments of the electronically-switchable filter are each further operable to reject a third portion of the beam of light on the first and second passes, respectively; and
the electronically-switchable filter comprises a third segment that is operable to receive the third portion of the beam of light upon a third pass, the third portion of the beam of light accepted by the third segment of the electronically-switchable filter on the third pass.

5. The image display system of claim 1, wherein the electronically-switchable filter comprises a reflective filter, the first segment of the electronically-switchable filter operable to:
accept the first portion of the beam of light on the first pass by reflecting the first portion from a first surface of the electronically-switchable filter that is proximate to the light source, the first portion reflected in the direction of the modulator; and
reject the second portion of the beam of light on the first pass by passing the second portion through the electronically-switchable filter in the direction of a mirror that is proximate to a second surface of the electronically-switchable filter.

6. The image display system of claim 5, wherein the mirror is operable to:
receive the second portion of the beam of light on the first pass;
reflect the second portion of the beam of light to cause the second portion to travel through the electronically-switchable filter in a reverse direction.

7. The image display system of claim 6, further comprising an integrating rod operable to: receive the second portion of the beam of light after the beam of light travels through the electronically-switchable filter in the reverse direction; and redirect the second portion of the beam of light to cause the second portion to travel toward the second segment of the electronically-switchable filter on the second pass.

8. An image display system, comprising:
a light source operable to produce a beam of light;
an electronically-switchable filter comprising a plurality of active filters, each filter comprising input and output polarization retardation stacks with a single-cell liquid-crystal switch in between, the electronically-switchable filter operable to:
receive the beam of light at a first segment upon a first pass, a first portion of the beam of light accented by the first segment of the electronically-switchable filter and a second portion of the beam of light rejected by the first segment of the electronically-switchable filters; and
receive the second portion of the beam of light at a second segment upon a second pass, the second portion of the beam of light accented by the second segment of the electronically-switchable filter on the second pass; and
a modulator operable to:
receive the first and second portions of the beam of light from the electronically-switchable filter; and
modulate the first and second portions of the beam of light to produce at least a portion of a displayed image.

9. An image display system, comprising:
a light source operable to produce a beam of light;
an electronically-switchable filter comprising a plurality of selectively transmissive and selectively reflective segments, the electronically-switchable filter operable to:
receive the beam of light at a first segment upon a first pass, a first portion of the beam of light accepted by the first segment of the electronically-switchable filter and a second portion of the beam of light rejected by the first segment of the electronically-switchable filters;
receive the second portion of the beam of light at a second segment upon a second pass, the second portion of the beam of light accepted by the second segment of the electronically-switchable filter on the second pass; and
be electrically switched off and on to create a scrolling pattern of light; and
a modulator operable to:
receive the first and second portions of the beam of light from the electronically-switchable filter; and
modulate the first and second portions of the beam of light to produce at least a portion of a displayed image.

10. An image display system, comprising:
a light source operable to produce a beam of light;
an electronically-switchable filter comprising a plurality of selectively transmissive and selectively reflective segments, the electronically-switchable filter operable to:
receive the beam of light at a first segment upon a first pass, a first portion of the beam of light accepted by the first segment of the electronically-switchable filter and a second portion of the beam of light rejected by the first segment of the electronically-switchable filter; and receive the second portion of the beam of light at a second segment upon a second pass, the second portion of the beam of light accepted by the second segment of the electronically-switchable filter on the second pass; and a modulator operable to:
receive the first and second portions of the beam of light from the electronically-switchable filter; and
modulate the first and second portions of the beam of light to produce at least a portion of a displayed image;

wherein the electronically-switchable filter comprises a transmissive filter, the first segment of the electronically-switchable filter operable to:
accept the first portion of the beam of light on the first pass by passing the first portion through the electronically-switchable filter in the direction of the modulator; and
reject the second portion of the beam of light on the first pass by reflecting the second portion from a first surface of the electronically-switchable filter, the first surface proximate to the light source and the second portion reflected in the direction of the light source.

11. The image display system of claim 10, further comprising an integrating rod operable to:
receive the second portion of the light beam from the first segment of the electronically-switchable filter; and
redirect the second portion of the light beam such that the second portion of the light beam travels toward the second segment of the electronically-switchable filter.

12. A method for transmitting light in an image display system, comprising:
generating a beam of light from a light source;
directing the beam of light at a first segment of an electronically-switchable filter, a first portion of the beam of light accepted by the first segment of the electronically-switchable filter and a second portion of the beam of light rejected by the first segment of the electronically-switchable filter;
modulating the first portion of the light beam to produce at least a portion of a displayed image;
recycling the second portion of the light beam to redirect the second portion of the light beam at a second segment of the electronically-switchable filter, the second portion of the light beam accepted by the second segment of the electronically-switchable filter; and
modulating the second portion of the light beam to produce at least a portion of the displayed image.

13. The method of claim 12, wherein directing the beam of light at the electronically-switchable filter comprises directing the beam of light at a stack of a plurality of electronically-switchable Bragg gratings, each of the plurality of electronically-switchable Bragg gratings optimized to accept a unique passband of light.

14. The method of claim 12, further comprising:
rejecting a third portion of the beam of light at the first segment of the electronically-switchable filter upon the first pass;
rejecting the third portion of the beam of light at the second segment of the electronically-switchable filter upon the second pass; and
receiving the third portion of the beam of light at a third segment of the electronically-switchable filter upon a third pass, the third portion of the beam of light accepted by the third segment of the electronically-switchable filter on the third pass.

15. The method of claim 12, further comprising electrically switching the plurality of selectively transmissive and selectively reflective segments off and on to create a scrolling pattern of light.

16. The method of claim 12, wherein:
directing the beam of light at the electronically-switchable filter comprises directing the beam of light at a reflective filter;
accepting the first portion of the beam of light on the first pass comprises
reflecting the first portion, from a first surface of the electronically-switchable filter that is proximate to the light source, in the direction of a modulator; and
rejecting the second portion of the beam of light on the first pass comprises passing the second portion through the electronically-switchable filter in the direction of a minor that is proximate to a second surface of the electronically-switchable filter.

17. The method of claim 16, further comprising:
receiving the second portion of the beam of light on the first pass at the mirror; reflecting the second portion of the beam of light, from the mirror, to cause the second portion to travel through the electronically-switchable filter in a reverse direction;
receiving, at an integrating rod, the second portion of the beam of light after the beam of light travels through the electronically-switchable filter in the reverse direction; and
redirecting the second portion of the beam of light within the integrating rod to cause the second portion to travel toward the second segment of the electronically-switchable filter on the second pass.

18. The method of claim 12, wherein:
directing the beam of light at the electronically-switchable filter comprises directing the beam of light at a transmissive filter;
accepting the first portion of the beam of light on the first pass comprises passing the first portion trough the electronically-switchable filter in the direction of a modulator; and
rejecting the second portion of the beam of light on the first pass comprises reflecting the second portion, from a first surface of the electronically-switchable filter proximate to the light source, in the direction of the light source.

19. The method of claim 18, further comprising:
receiving, at an integrating rod, the second portion of the light beam from the first segment of the electronically-switchable filter; and
redirecting the second portion of the light beam within the integrating rod such that the second portion of the light beam travels toward the second segment of the electronically-switchable filter.

* * * * *